UNITED STATES PATENT OFFICE 2,014,484

AZO DYESTUFFS

Richard Stüsser, Cologne-Deutz, Karl Dobmaier, Leverkusen, and Richard Stroebel, Dusseldorf, Germany, assignors to General Aniline Works, Inc., New York, N. Y., a corporation of Delaware No Drawing. Application December 30, 1931, Serial No. 584,014. In Germany January 10, 1931

4 Claims. (Cl. 260—78)

The present invention relates to new azo dyestuffs forming heavy metal complex compounds, more particularly it relates to dyestuffs which may be represented by the probable general formula

R—N=N—R′ wherein R stands for the radical of a diazotization component of the benzene or naphthalene series containing a substituent of the group consisting of hydroxyl and carboxylic acid group which substituent stands in ortho-position to the azo group attached to the radical R in accordance with the above formula, which R may be further substituted by a sulfonic acid group, a nitro group, alkyl, alkoxy, halogen and the group —N=N—R′, in which R′ means the same as defined hereafter, R′ stands for a radical of a hydroxy- or an aminocarbazole compound capable of being coupled to form an azo dyestuff, that means a carbazole being substituted at least by a hydroxy- or/and an amino-group and having a free position in ortho-position to the hydroxy or amino group, R′ may be further substituted by a sulfonic acid group, a carboxylic acid group, alkyl and the group —N=N—R, in which R means the same as stated above, the substituents —N=N—R and —N=N—R′ not being simultaneously present in the molecule.

We wish it to be understood that the mononuclear aromatic amines of the benzene series as well as diphenyl compounds, such as benzidine derivatives or other diaminodiphenyl compounds in which the phenyl nuclei are linked together by a bridge such as a sulfone bridge, a urea bridge or an azo group fall within the scope of the definition of the figure R of the above formula.

Our new dyestuffs are obtainable in the usual manner of preparing azo dyestuffs by diazotizing or tetrazotizing an aromatic amine of the benzene or naphthalene series or by diazotizing an amino azo compound and coupling with the coupling components referred to above. The various methods of synthesizing our new dyestuffs more fully are described in the following examples.

The new dyestuffs generally are dark powders dyeing brown to blackish violet shades; the dyestuffs containing a sulfonic or carboxylic acid group are in the form of their alkali metal salts water soluble dark powders, dyeing the fibre brown to blackish violet shades which by after-treatment with a suitable heavy metal compound, especially a copper, chromium or cobalt compound, become very fast to light. The heavy metal complex compounds of our new dyestuffs prepared in substance partially are valuable for dyeing leather.

We wish it to be understood that both the dyestuffs free from the heavy metal as well as the heavy metal complex compounds are included within the scope of our invention.

The following examples illustrate the invention without limiting it thereto:—

*Example 1.*—224 parts by weight of 6-chloro-1-hydroxy-2-amino benzene-4-sulfonic acid are diazotized in the usual manner with 69 parts by weight of sodium nitrite and 350 parts by weight of hydrochloric acid of 19½° Bé. and coupled in alkaline solution with 198 parts by weight of 2-hydroxy-3-aminocarbazole. The coupling may be accelerated by the addition of a small quantity of pyridine. When the coupling is complete, the dyestuff, having in its free state the following formula:

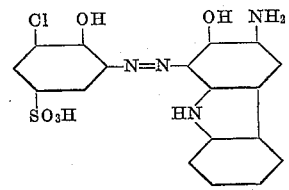

is salted out, filtered and dried. It is a dark, water-soluble powder, dyeing wool from an acid bath yellowish brown shades which turn to a brownish violet fast to milling and potting by after chroming.

*Example 2.*—Analogously to the process described in Example 1 there is obtained from 1 mol of diazotized 6-nitro-2-amino-1-hydroxy-benzene-4-sulfonic acid and 1 mol of 2-hydroxy-carbazole a dyestuff having in its free state the following formula:

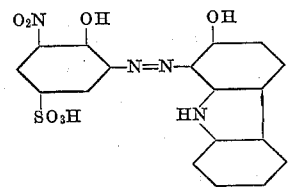

dyeing wool brown shades which by after-chroming become violet, by after cobalting red very fast to light.

*Example 3.*—Analogously to the process described in Example 1 there is obtained from 1 mol of diazotized 6-nitro-2-amino-1-hydroxy-benzene-4-sulfonic acid and 1 mol of 2-aminocarbazole a dyestuff dyeing wool, when after chromed, brownish black shades fast to milling and potting.

*Example 4.*—Analogously to the process described in Example 1 there is obtained from 1 mol of diazotized 6-chloro-2-amino-1-hydroxybenzene-4-sulfonic acid and 1 mol of 2-hydroxycarbazole a dyestuff dyeing wool, when after chromed, violet shades.

By substituting the 2-hydroxycarbazole by the 2-hydroxycarbazole-3-carboxylic acid, there is obtained a dyestuff yielding, when after chromed violet reddish-brown shades.

By substituting the 6-chloro-2-amino-1-hydroxybenzene-4-sulfonic acid, by the 2-amino-1-hydroxybenzene-4,6-disulfonic acid there is obtained a dyestuff dyeing wool, when after chromed, reddish-violet shades.

*Example 5.*—Analogously to the process described in Example 1 there is obtained from 1 mol of diazotized 4-chloro-2-amino-1-hydroxybenzene-6-sulfonic acid and 1 mol of 9-methyl-2-hydroxycarbazole a dyestuff dyeing wool, when after chromed violet shades.

*Example 6.*—Analogously to the process described in Example 1 there is obtained from 2 mols of 4-nitro-2-amino-1-hydroxybenzene and 1 mol of 1,8-dihydroxycarbazole-3,6-disulfonic acid a dyestuff having in its free state the following formula:—

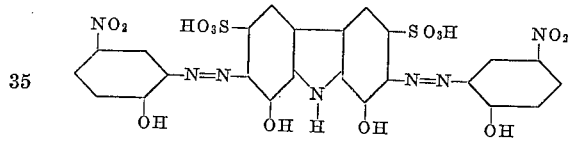

dyeing wool, when after chromed, reddish black shades of good fastness to carbonizing and potting.

By substituting the 4-nitro-2-amino-1-hydroxybenzene by 2 mols of 2-amino-benzoic acid there is obtained a dyestuff dyeing wool, when after chromed, reddish brown shades.

*Example 7.*—Analogously to the process described in Example 1, there is obtained from 1 mol of diazotized 4-sulfo-2-aminobenzoic acid and 1 mol of 3-amino-2-hydroxycarbazole a dyestuff dyeing wool, when after chromed, reddish violet shades.

*Example 8.*—Analogously to the process described in Example 1, there is obtained from 1 mol of diazotized 5-sulfo-3-amino-2-hydroxybenzoic acid and 1 mol of 2-hydroxycarbazole a dyestuff dyeing wool, when after chromed, yellowish brown shades.

*Example 9.*—Analogously to the process described in Example 1, there is obtained from 1 mol of 5-nitro-3-amino-2-hydroxybenzoic acid and 1 mol of 1-hydroxycarbazole-3.6-disulfonic acid a dyestuff having in its free state the following formula:

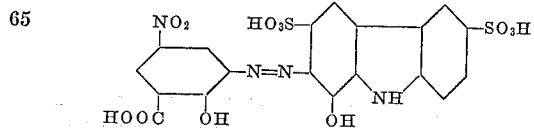

dyeing wool, when after chromed, reddish brown shades.

*Example 10.*—When tetrazotizing 1 mol of 4,4'-diaminodiphenyl-3,3'-dicarboxylic acid and successively coupling with 1 mol of 2-hydroxycarbazole and 1 mol of resorcin there is obtained a dyestuff having in its free state the following formula

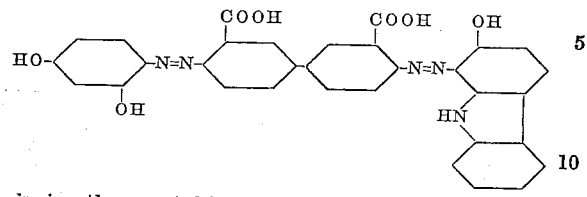

dyeing the vegetable fibre, when after treated with a copper compound yielding copper, reddish brown shades.

*Example 11.*—Analogously to the process described in Example 1, there is obtained from 1 mol of diazotized 4-hydroxy-3-amino-1-methylbenzene and 1 mol of 1.8-dihydroxycarbazole-3.6-disulfonic acid a dyestuff dyeing wool, when after chromed, a violet-tinged brown.

By substituting the 4-hydroxy-3-amino-1-methylbenzene by 1 mol of 1,4-dimethoxy-2-amino-5-nitrobenzene, there is obtained a dyestuff dyeing wool when after chromed reddish brown shades.

*Example 12.*—Analogously to the process described in Example 1, there is obtained from 1 mol of diazotized 5-sulfo-2-aminobenzoic acid and 1 mol of 2-hydroxycarbazole-3-carboxylic acid a dyestuff having in its free state the following formula

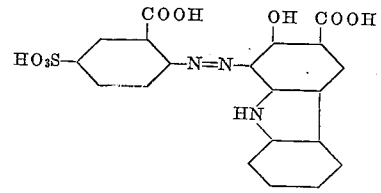

dyeing wool reddish brown shades. By after chroming a brownish red of good fastness properties is obtained.

By refluxing the dyestuff with the addition of chromium formate until the dyestuff is no more sensitive to acids and alkalies a complex chromium compound is obtained dyeing leather brown shades of excellent fastness to light.

*Example 13.*—By coupling 1 mol of diazotized 2-amino-1-hydroxybenzene-4-sulfonic acid with 1 mol of 1,2-benzocarbazole-3'-hydroxy-2'-carboxylic acid there is obtained a dyestuff having in its free state the following formula

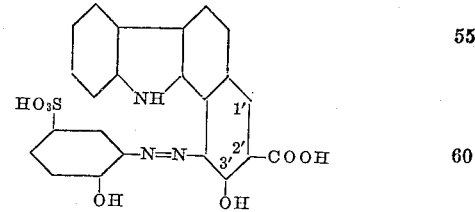

in aqueous sodium carbonate solution and boiling with the addition of ammoniacal copper sulfate solution, there is obtained a complex copper compound of the dyestuff dyeing leather a violet tinged black of good fastness to light.

The complex chromium compound of the dyestuff which is obtainable by boiling the same with chromium fluoride dyes leather greenish black shades of good fastness properties.

*Example 14.*—15.4 parts by weight of 4-nitro-2-aminophenol are diazotized and added to an ice cold solution of 20.2 parts by weight of 2- hydroxycarbazole, dissolved in 500 parts by weight of water with the addition of 4 parts by weight of caustic soda and 50 parts by weight of soda. The dyestuff separates, is sucked off and refluxed in 500 parts by weight of triethanolamine with the addition of 40 parts by weight of a chromium chloride solution of 50% strength until the dyestuff is no more sensitive to alkalies and dilute acids. By the addition of water, the dyestuff is precipitated and is sucked off after cooling. It is a dark powder soluble in organic solvents such as pyridine and is a valuable pigment dyestuff.

*Example 15.*—25.3 parts by weight of 5-nitro-2-anisidine-4-sulfonic acid are diazotized and introduced into an ice cold solution, prepared by dissolving 20.2 parts by weight of 2-hydroxycarbazole and 500 parts by weight of water with the addition of 4 parts by weight of caustic soda and 50 parts by weight of soda. The isolated dyestuff is transformed into its complex copper compound by refluxing for several hours in an ammoniacal solution prepared from 30 parts by weight of copper sulfate. The copper compound having in the free state probably the following formula:

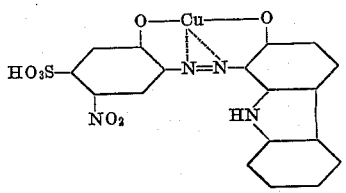

is a brown water soluble powder, dyeing leather fawn-colored shades of good fastness to light.

*Example 16.*—When tetrazotizing 1 mol of 4.4'-diaminodiphenylurea-3.3'-dicarboxylic acid and successively coupling with 1 mol of 1-hydroxycarbazole-3.6-disulfonic acid and 1 mol of the pyrazolone of 2-aminonaphthalene-4.8-disulfonic acid, there is obtained a dyestuff having in its free state the following formula

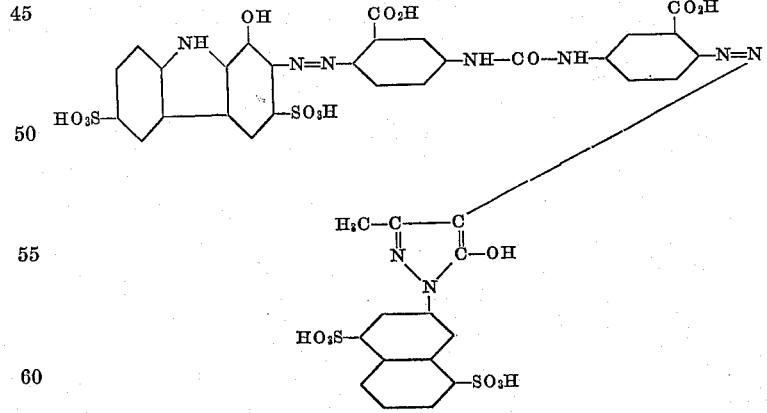

The complex copper compound of this dyestuff is a brown water soluble powder dyeing the cellulose fibre brown shades very fast to light.

We claim:—

1. Azo dyestuffs of the general formula:

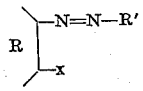

wherein R stands for the radical of a diazotization component of the benzene or naphthalene series, x stands for a hydroxy or carboxylic acid group and R' stands for the radical of a hydroxy- or an amino-carbazole compound capable of being coupled to form an azo dyestuff, being generally dark powders dyeing brown to blackish violet shades and yielding when after-treated with a compound yielding a heavy metal of the group consisting of copper, chromium and cobalt the corresponding heavy metal complex compounds of the azo dyestuffs.

2. The azo dyestuff of the following formula:

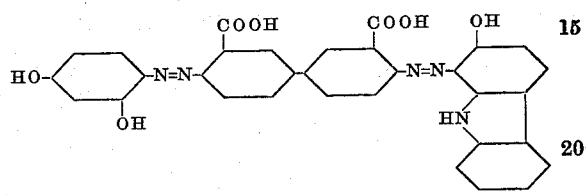

dyeing the vegetable fibre, when after-treated with a copper compound yielding copper, reddish brown shades.

3. The azo dyestuff of the following formula:

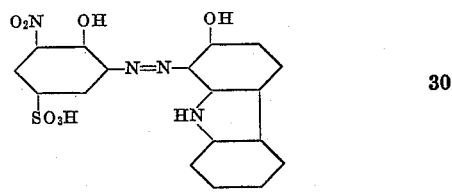

dyeing wool brown shades which by after-chroming become violet, by after-cobalting red, very fast to light.

4. The azo dyestuff of the following formula:

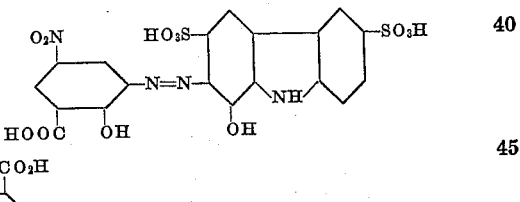

dyeing wool, when after-chromed, reddish brown shades.

RICHARD STÜSSER.
KARL DOBMAIER.
RICHARD STROEBEL.